United States Patent
Cho

(10) Patent No.: US 11,221,049 B2
(45) Date of Patent: Jan. 11, 2022

(54) CLUTCH CONTROL METHOD FOR VEHICLE

(71) Applicants: HYUNDAI MOTOR COMPANY, Seoul (KR); KIA MOTORS CORPORATION, Seoul (KR)

(72) Inventor: Sung Hyun Cho, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/019,758

(22) Filed: Sep. 14, 2020

(65) Prior Publication Data
US 2021/0324925 A1    Oct. 21, 2021

(30) Foreign Application Priority Data

Apr. 21, 2020    (KR) .................... 10-2020-0047836

(51) Int. Cl.
*F16D 48/06*    (2006.01)
*F16D 48/02*    (2006.01)
*F16D 25/08*    (2006.01)

(52) U.S. Cl.
CPC ......... *F16D 48/066* (2013.01); *F16D 25/082* (2013.01); *F16D 25/14* (2013.01); *F16D 2048/0218* (2013.01); *F16D 2500/10412* (2013.01); *F16D 2500/30406* (2013.01); *F16D 2500/50287* (2013.01)

(58) Field of Classification Search
None
See application file for complete search history.

(56) References Cited

FOREIGN PATENT DOCUMENTS

KR    10-0793896    1/2008

*Primary Examiner* — Timothy Hannon
(74) *Attorney, Agent, or Firm* — Lempia Summerfield Katz LLC

(57) ABSTRACT

A clutch control method for a vehicle includes: increasing, by a controller, a clutch torque to a refill execution torque at a predetermined first inclination when a predetermined first reference time period has elapsed in a micro-slip state of a clutch; increasing, by the controller, the clutch torque to a refill torque at a predetermined second inclination to initiate refilling of a pressure chamber of a hydraulic-driving actuator with oil in a reservoir tank when the clutch torque reaches the refill execution torque; and maintaining the clutch torque at the refill torque during a predetermined second reference time period.

7 Claims, 4 Drawing Sheets

CLUTCH CONTROL METHOD FOR VEHICLE

CROSS-REFERENCE TO THE RELATED APPLICATION

This application claims priority to and the benefit of Korean Patent Application No. 10-2020-0047836, filed on Apr. 21, 2020, the entire contents of which are incorporated herein by reference.

FIELD

The present disclosure relates to technology for controlling a clutch selectively performing power transfer between an engine and a transmission.

BACKGROUND

The statements in this section merely provide background information related to the present disclosure and may not constitute prior art.

A transmission of a vehicle receives power from an engine, converts the received power into power suitable for driving wheels, and outputs the converted power.

A transmission is connected to an engine via a clutch. When the clutch is in a disengaged state, the transmission performs a shift operation. When the shift operation is completed, the transmission is connected again to the engine.

A normally-closed-type clutch, which basically maintains the transfer of power from an engine to a transmission, is mainly used. When operating force is input to the clutch by the operation of a clutch pedal by a driver or the operation of an actuator, the clutch is opened, whereby the input of power to the transmission is interrupted.

Recently, there has been developed technology of operating, by a controller, the aforementioned clutch using an actuator or the like according to the travel conditions of a vehicle without operation of a clutch pedal on the part of a driver, thereby improving convenience in driving.

In order for a controller to control a clutch, it is desired to accurately determine the actual torque transfer characteristics of the clutch depending on the stroke of an actuator controlled by the controller.

That is, the controller has data on a torque-stroke curve (a T-S curve) stored therein, which indicates the torque transfer characteristics of a clutch depending on the stroke of an actuator. The controller calculates an actuator stroke for realizing a desired clutch torque, and controls the actuator based thereon, thereby indirectly controlling the clutch.

However, the characteristics of the clutch tend to vary considerably depending on the temperature of the clutch. Therefore, it is desired to frequently update the T-S curve through learning in order to realize a desired shift operation sensation through appropriate operation of the clutch to thus improve the travel performance of a vehicle.

Particularly, in some cases, in order for the controller to operate the clutch, a hydraulic actuator is used. In the case in which pressure is continuously applied to oil that generates hydraulic pressure, the characteristics of the actuator may vary according to an increase in the temperature of the oil, which results in variation in torque transfer characteristics of the clutch depending on the stroke of the actuator.

Hereinafter, the T-S curve described above will be referred to as "clutch characteristics".

SUMMARY

The present disclosure provides a clutch control method for a vehicle, which reduces or minimizes variation in the physical characteristics of oil for generating hydraulic pressure, such as an increase in the temperature of the oil, in the configuration in which a clutch is controlled using a hydraulic actuator, thereby continuously maintaining and securing more accurate control of the clutch.

In one form of the present disclosure, a clutch control method for a vehicle includes: increasing, by a controller, a clutch torque to a refill execution torque at a predetermined first inclination when a predetermined first reference time period has elapsed in a micro-slip state of a clutch, increasing, by the controller, the clutch torque to a refill torque at a predetermined second inclination to initiate refilling of a pressure chamber of a hydraulic-driving actuator with oil in a reservoir tank when the clutch torque reaches the refill execution torque, and maintaining the clutch torque at the refill torque during a predetermined second reference time period.

The controller may learn clutch characteristics during the predetermined first reference time period during which the micro-slip state is maintained.

The method may further include reducing, by the controller, the clutch torque so that the clutch forms the micro-slip state after the clutch torque is maintained at the refill torque during the predetermined second reference time period, and confirming, by the controller, the clutch characteristics learned during the predetermined first reference time period while maintaining the micro-slip state after reducing the clutch torque.

The method may further include increasing, by the controller, the clutch torque again to the refill execution torque at the predetermined first inclination after confirming the learned clutch characteristics, and increasing, by the controller, the clutch torque to the refill torque at the predetermined second inclination.

The predetermined first inclination may be set to be less than the predetermined second inclination, and the predetermined second inclination may be set to a maximum possible value.

The refill execution torque may be set to a clutch torque value corresponding to a position of a piston, provided to generate pressure in the pressure chamber of the hydraulic-driving actuator, just before the pressure chamber communicates with the reservoir tank.

The refill torque may be set to a clutch torque value corresponding to a position of the piston at which the piston fully opens a passage provided to communicate with the reservoir tank.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
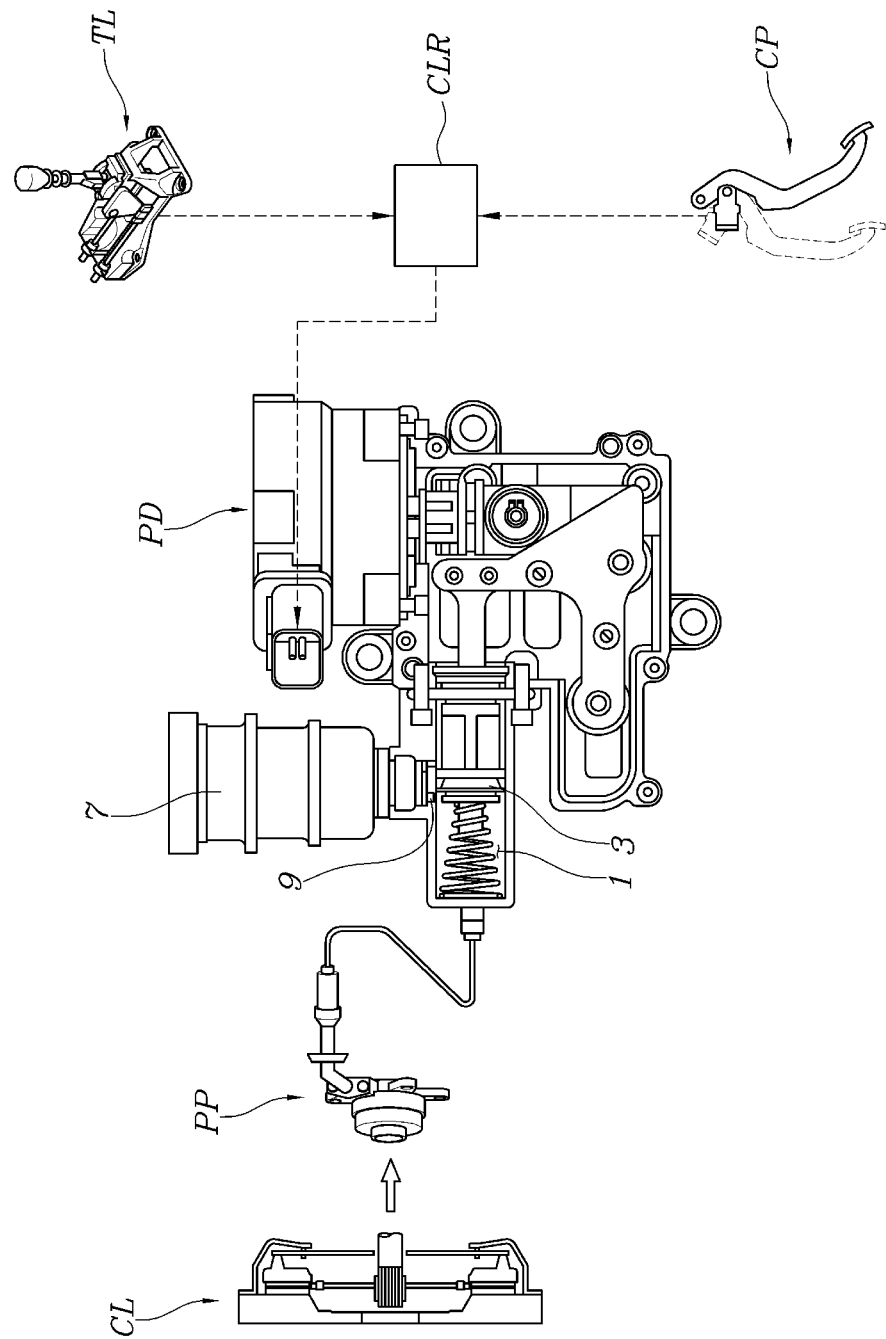
FIG. 1 is a view showing the engaged state of a clutch in a clutch system of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a clutch control method for a vehicle according to exemplary forms of the present disclosure will be described with reference to the accompanying drawings.

Figure 2:
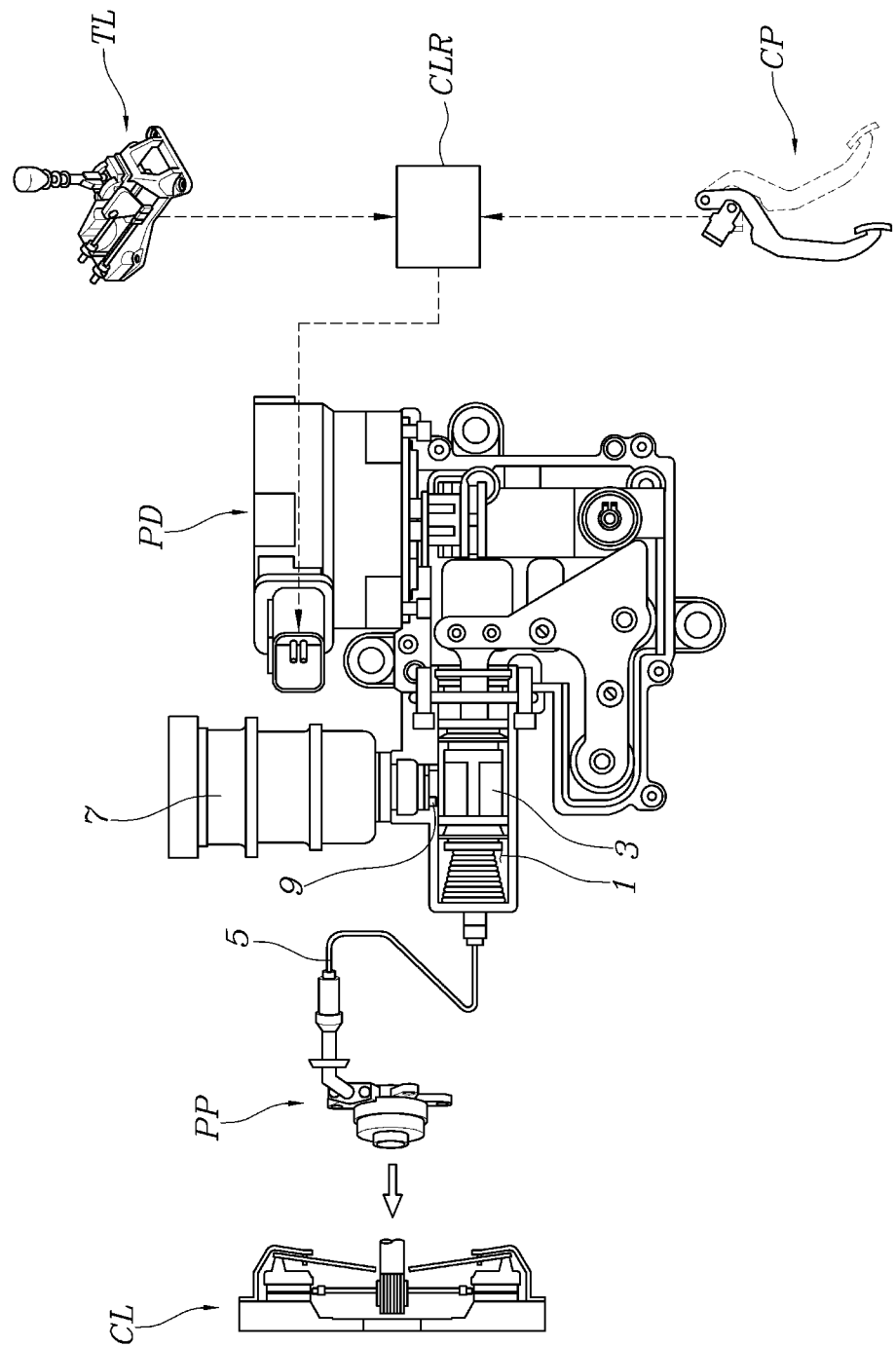
FIG. 2 is a view showing the disengaged state of the clutch in the clutch system shown in FIG. 1.

Referring to FIGS. 1 and 2, a clutch system of a vehicle, to which the present disclosure is applicable, is configured such that, when a controller CLR receives the operation state of a shift lever TL and the operation state of a clutch pedal CP and controls a hydraulic-driving actuator PD to generate hydraulic pressure, the generated hydraulic pressure is transferred to a hydraulically driven actuator PP, which is mounted to a clutch CL, to drive the clutch CL.

Alternatively, the controller CLR may be configured not to separately receive the operation state of the clutch pedal CP but to control the clutch CL during a shift operation by determining the travel conditions of the vehicle.

The clutch CL is of a normally-closed type, which basically forms the state shown in FIG. 1. Thus, the power from an engine is continuously input to a transmission through the clutch CL.

In order to disengage the clutch CL, the controller CLR drives the hydraulic-driving actuator PD so that a piston 3 in a pressure chamber 1 moves to the left on the basis of FIG. 2. Thereby, hydraulic pressure is generated in the oil in the pressure chamber 1, and the hydraulic pressure is transferred to the hydraulically driven actuator PP through a pressure pipe 5, thereby opening the clutch CL.

Thus, as the stroke of the piston 3 increases, the hydraulic pressure in the pressure chamber 1 is increased, and accordingly, the clutch torque of the clutch CL is reduced.

In order to re-engage the opened clutch CL, the piston 3 is returned so that the pressure in the pressure chamber 1 is reduced.

When the piston 3 is returned to the state shown in FIG. 1, the pressure chamber 1 communicates with a reservoir tank 7, and the oil stored in the reservoir tank 7 enters the pressure chamber 1 and mixes with the oil in the pressure chamber 1, thereby reducing the temperature of the oil in the pressure chamber 1.

Figure 3:
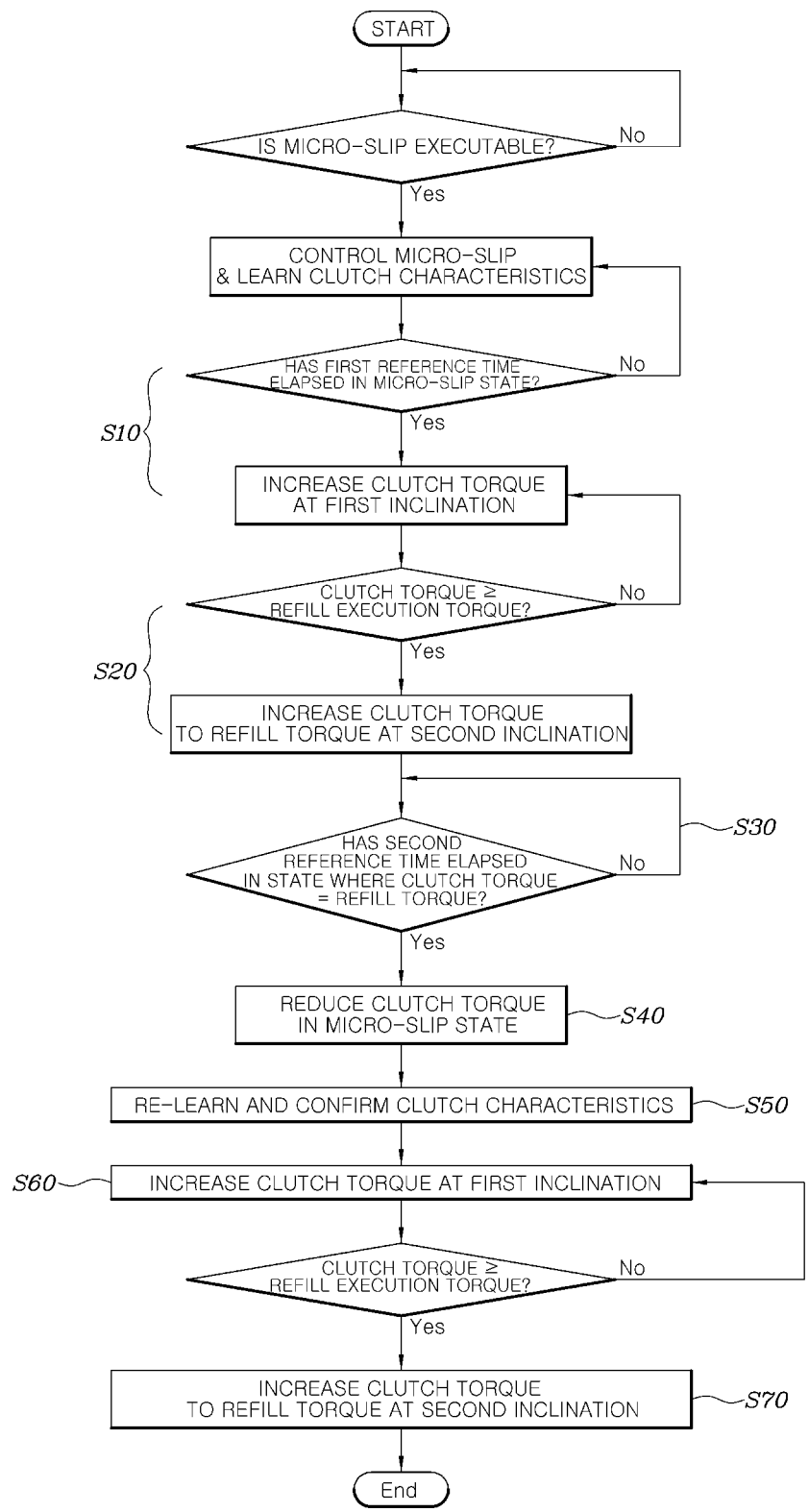
FIG. 3 is a flowchart illustrating a clutch control method for a vehicle according to another form of the present disclosure.
Figure 4:
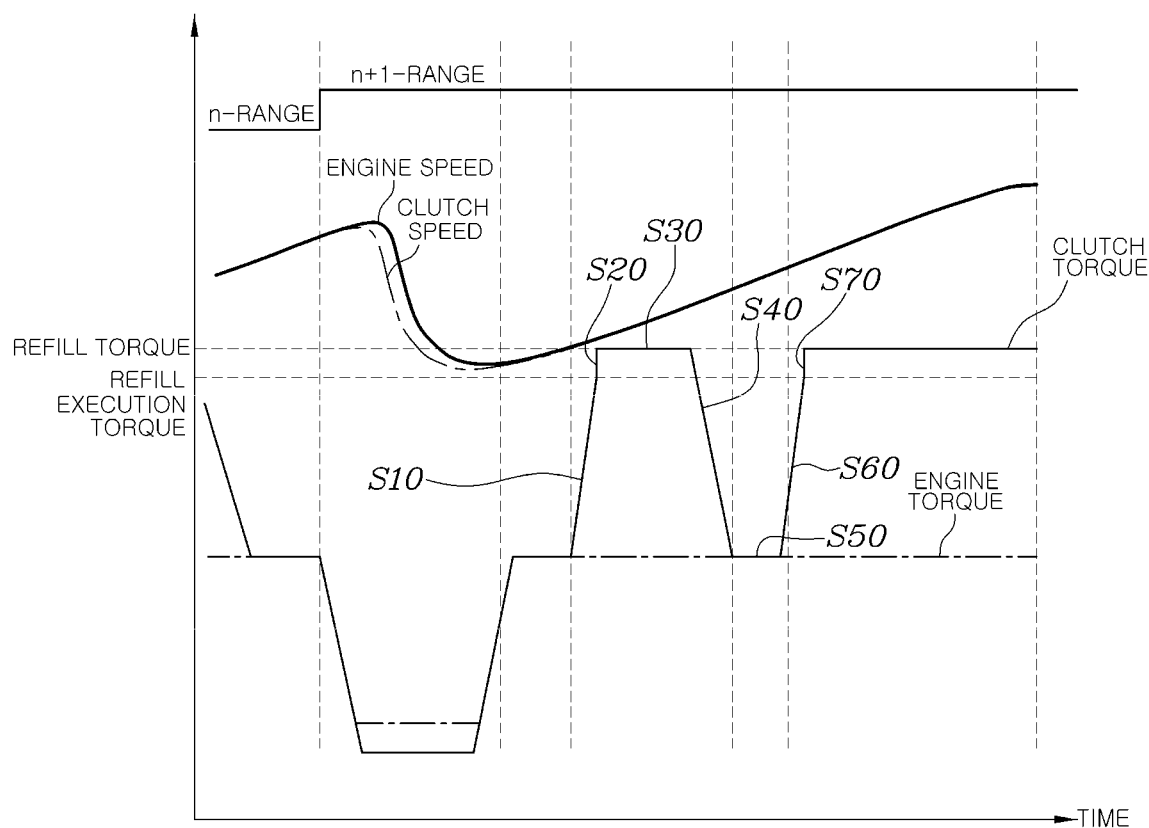
FIG. 4 is a graph showing the clutch control method for a vehicle in one form of the present disclosure.

Referring to FIGS. 3 and 4, in one form of the present disclosure, a clutch control method for a vehicle includes: a step of increasing, by the controller CLR, a clutch torque to a refill execution torque at a predetermined first inclination when a predetermined first reference time period has elapsed in a micro-slip state of the clutch (S10), a step of increasing, by the controller CLR, the clutch torque to a refill torque at a predetermined second inclination to initiate refilling of the pressure chamber 1 of the hydraulic-driving actuator PD with the oil in the reservoir tank 7 when the clutch torque reaches the refill execution torque (S20), and a step of maintaining the clutch torque at the refill torque during a predetermined second reference time period (S30).

That is, when the micro-slip state of the clutch CL is maintained for a predetermined time period or longer, the controller CLR increases the clutch torque in order to refill the pressure chamber 1 with the oil in the reservoir tank 7, thereby reducing the temperature of the oil in the pressure chamber 1, thus reducing or minimizing variation in the clutch characteristics according to an increase in the temperature of the oil.

As such, if variation in the clutch characteristics is reduced or minimized by appropriately reducing the temperature of the oil that generates hydraulic pressure, the controller CLR is capable of more accurately and stably controlling the clutch CL.

The controller CLR determines the conditions under which micro-slip is executable. Upon determining that micro-slip is executable, the controller CLR creates the micro-slip state and learns the clutch characteristics during the first reference time period during which the micro-slip state is maintained.

The conditions under which micro-slip is executable may be set taking into consideration the state of the vehicle in which the engaged state of the clutch CL is capable of being stably maintained for a predetermined time period or longer, such as, for example, the state in which a shift operation is not being performed or the state in which the vehicle is not starting to move.

The micro-slip state is a state in which slight slippage, which is about 20 RPM, occurs in the clutch CL. The slippage is a speed difference between opposite sides of the clutch CL, i.e. between the engine and the input shaft of the transmission.

In the micro-slip state, it can be considered that the engine torque in this state is substantially the same as the torque transferred through the clutch. Thus, in a vehicle in which it is impossible to directly measure the clutch torque, learning is performed in a manner of forming the micro-slip state of the clutch, taking the engine torque in this state as the clutch torque, and applying the stroke of the actuator that forms the micro-slip state to the clutch torque.

Here, the stroke of the actuator may be considered to be the stroke of the piston 3 shown in FIGS. 1 and 2.

The first reference time period may be set in consideration of the time period during which learning of the clutch characteristics is possible through a large number of experiments. For example, the first reference time period may be set to 30 ms.

The refill execution torque is set to a clutch torque value that corresponds to a position of the piston 3, which generates pressure in the pressure chamber 1 of the hydraulic-driving actuator PD, just before the pressure chamber 1 communicates with the reservoir tank 7. The refill torque is set to a clutch torque value that corresponds to a position of the piston 3 at which the piston 3 fully opens a passage that communicates with the reservoir tank 7.

That is, as shown in FIG. 1, the clutch torque value that corresponds to the position of the piston 3 at which the piston 3 completely opens an orifice 9, which is a passage connecting the pressure chamber 1 to the reservoir tank 7, is equivalent to the refill torque. The clutch torque value that corresponds to the position of the piston 3 just before opening the orifice 9, which is a position slightly shifted to the left from that shown in FIG. 1, is equivalent to the refill execution torque.

In one form, the first inclination at which the clutch torque is increased is set to be less than the second inclination, and the second inclination is set to a maximum possible value.

When the clutch torque is increased to the refill execution torque, the speed at which the clutch torque is increased is relatively high. This is for quick execution of the control process of the present disclosure in order to prepare for the situation in which the driver operates the clutch pedal CP again. When the clutch torque reaches the refill execution torque, the piston 3 is returned at the second inclination, which is greater than the first inclination, in order to more smoothly refill the pressure chamber 1 with the oil in the reservoir tank 7.

In one form, the second inclination may be set to a value for returning the piston 3 at the maximum possible speed of the hydraulic-driving actuator PD.

The second reference time period may be set based on the time period during which the temperature of the oil in the pressure chamber is sufficiently reduced by the above-described refill operation. For example, the second reference time period may be set to 100 ms.

The clutch control method further includes: a step of reducing, by the controller CLR, the clutch torque so that the clutch again forms the micro-slip state after the clutch torque is maintained at the refill torque during the second reference time period (S40), and a step of confirming, by the controller CLR, the clutch characteristics learned during the first reference time period while maintaining the micro-slip state after reducing the clutch torque (S50).

That is, the controller CLR determines whether the clutch characteristics learned during the first reference time period are appropriate through the above-described steps.

The clutch control method further includes: a step of increasing, by the controller CLR, the clutch torque again to the refill execution torque at the first inclination after confirming the learned clutch characteristics (S60), and a step of increasing, by the controller CLR, the clutch torque to the refill torque at the second inclination (S70).

Upon determining that the learned clutch characteristics are appropriate, the controller CLR again increases the clutch torque to the refill torque to continuously maintain the completely engaged state of the clutch CL until a separate situation, such as operation of the clutch pedal CP on the part of the driver, occurs, and terminates the control process of the present disclosure.

Upon determining that the clutch characteristics learned during the first reference time period are not appropriate, the controller CLR maintains the second micro-slip state for a longer time period, and again learns the clutch characteristics.

As is apparent from the above description, according to the present disclosure, in the case in which a clutch is controlled using a hydraulic actuator, a pressure chamber, which is provided in the actuator in order to generate hydraulic pressure, is made to communicate with a reservoir tank so that the pressure chamber is refilled with the oil in the reservoir tank. Accordingly, variation in the physical characteristics of the oil, such as an increase in the temperature of the oil, may be reduced or minimized, and thus it is possible to continuously maintain and secure more accurate control of the clutch.

Although exemplary forms of the present disclosure have been disclosed for illustrative purposes, those skilled in the art will appreciate that various modifications, additions and substitutions are possible, without departing from the scope and spirit of the present disclosure.

What is claimed is:

1. A clutch control method for a vehicle, the method comprising:
   increasing, by a controller, a clutch torque to a refill execution torque at a predetermined first inclination when a predetermined first reference time period has elapsed in a micro-slip state of a clutch;
   increasing, by the controller, the clutch torque to a refill torque at a predetermined second inclination to initiate refilling of a pressure chamber of a hydraulic-driving actuator with oil in a reservoir tank when the clutch torque reaches the refill execution torque; and
   maintaining, by the controller, the clutch torque at the refill torque during a predetermined second reference time period.

2. The method according to claim 1, further comprising:
   learning, by the controller, clutch characteristics during the predetermined first reference time period during which the micro-slip state is maintained.

3. The method according to claim 2, further comprising:
   reducing, by the controller, the clutch torque so that the clutch forms the micro-slip state after the clutch torque is maintained at the refill torque during the predetermined second reference time period; and
   confirming, by the controller, the clutch characteristics learned during the predetermined first reference time period while maintaining the micro-slip state after reducing the clutch torque.

4. The method according to claim 3, further comprising:
   increasing, by the controller, the clutch torque again to the refill execution torque at the predetermined first inclination after confirming the learned clutch characteristics; and
   increasing, by the controller, the clutch torque to the refill torque at the predetermined second inclination.

5. The method according to claim 1, wherein the predetermined first inclination is set to be less than the predetermined second inclination, and
   wherein the predetermined second inclination is set to a maximum possible value.

6. The method according to claim 1, wherein the refill execution torque is a clutch torque value corresponding to a position of a piston located just before the pressure chamber communicates with the reservoir tank, where the piston is provided to generate pressure in the pressure chamber of the hydraulic-driving actuator.

7. The method according to claim 6, wherein the refill torque is a clutch torque value corresponding to a position of the piston at which the piston fully opens a passage provided to communicate with the reservoir tank.

* * * * *